US010771925B1

(12) United States Patent
Zhao et al.

(10) Patent No.: US 10,771,925 B1
(45) Date of Patent: Sep. 8, 2020

(54) LOCALIZATION METHODS AND SYSTEM USING THE SAME

(71) Applicant: UBTECH ROBOTICS CORP LTD, Shenzhen (CN)

(72) Inventors: Yongsheng Zhao, Shenzhen (CN); Wanjun He, Shenzhen (CN); Yu Tang, Shenzhen (CN); Youjun Xiong, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 0 days.

(21) Appl. No.: 16/699,763

(22) Filed: Dec. 2, 2019

(30) Foreign Application Priority Data

Oct. 9, 2019 (CN) .......................... 2019 1 0954395

(51) Int. Cl.
*H04W 4/02* (2018.01)
*H04B 17/27* (2015.01)
*H04W 4/029* (2018.01)
*H04W 48/10* (2009.01)
*H04B 17/318* (2015.01)

(52) U.S. Cl.
CPC ............ *H04W 4/029* (2018.02); *H04B 17/27* (2015.01); *H04B 17/318* (2015.01); *H04W 4/023* (2013.01); *H04W 48/10* (2013.01)

(58) Field of Classification Search
CPC ..... H04W 4/029; H04W 4/023; H04W 48/10; H04B 17/27; H04B 17/318
See application file for complete search history.

(56) References Cited

U.S. PATENT DOCUMENTS

| 9,948,394 | B1 * | 4/2018 | Bitra | H04B 10/1149 |
|---|---|---|---|---|
| 10,484,833 | B1 * | 11/2019 | Torborg | G01S 1/68 |
| 10,667,232 | B2 * | 5/2020 | Miermont | G01S 5/00 |
| 2016/0341556 | A1 * | 11/2016 | Lin | H04W 8/005 |
| 2017/0013398 | A1 * | 1/2017 | Farrell | H04L 63/10 |
| 2017/0171833 | A1 * | 6/2017 | Vamaraju | H04W 60/04 |
| 2017/0261592 | A1 * | 9/2017 | Min | G01S 5/14 |
| 2018/0024223 | A1 * | 1/2018 | Williams | G01S 13/0209 342/463 |
| 2018/0067191 | A1 * | 3/2018 | Hamilton | G01S 5/0257 |
| 2018/0310133 | A1 * | 10/2018 | Ramasamy | H04W 4/025 |
| 2019/0037351 | A1 * | 1/2019 | Prevatt | G01S 5/0263 |
| 2019/0215751 | A1 * | 7/2019 | Lee | H04W 36/08 |
| 2019/0268847 | A1 * | 8/2019 | Asterjadhi | H04L 61/1541 |
| 2020/0037108 | A1 * | 1/2020 | Hurley | H04W 4/70 |
| 2020/0137983 | A1 * | 5/2020 | Nieveen | H04B 1/3827 |

* cited by examiner

Primary Examiner — Khawar Iqbal (57) ABSTRACT

The present disclosure provides localization methods and a system using the same. One of the methods includes: broadcasting a ranging frame in a awake state of a localization tag; obtaining a response frame returned by the first anchor according to the ranging frame; updating the ranging anchor list according to the response frame; and calculating a distance between the localization tag and the first anchor based on a time of broadcasting the ranging frame, a time of receiving the response frame, the time of the first anchor receiving the ranging frame, and the time of the first anchor transmitting the response frame. In such a manner, the localization tag is enabled to switch the anchor for ranging in time according to the updated ranging anchor list during movement, thereby automatically ranging with the nearby anchor.

20 Claims, 6 Drawing Sheets

LOCALIZATION METHODS AND SYSTEM USING THE SAME

CROSS REFERENCE TO RELATED APPLICATIONS

This application claims priority to Chinese Patent Application No. 201910954395.1, filed Oct. 9, 2019, which is hereby incorporated by reference herein as if set forth in its entirety.

BACKGROUND

1. Technical Field

The present disclosure relates to navigation technology, and particularly to localization methods and a system using the same.

2. Description of Related Art

Wireless localization is a method of measuring the location of an object by radio waves. A wireless localization system generally includes tags and anchors. The location of the anchors is fixed, where its coordinate has been determined in advance, and the tag can be moved in the localization scene. In a TOF (time of flight) wireless localization system, the tag periodically wirelessly communicate with the surrounding anchors to calculate the distance between the tag and the surrounding anchors. If the tag is to be made to have a longer endurance, a low-power design is needed. The low-power tag ranges with the surrounding anchor periodically and then enters a sleep state to save power. Since the tag cannot obtain signals from the surrounding anchors in the sleep state, the identity of the surrounding anchors is required to range with each anchor while the tag ranges with the surrounding anchors.

The ranging of the existing low-power tag is generally realized by writing the identity of all the anchors into the configuration of the tag, and the tag fixedly ranges with the anchors corresponding to the identity in the configuration. However, this method is only suitable for a small scene with a few anchors. When the amount of the anchors is large, the tag cannot switch the anchors for ranging.

BRIEF DESCRIPTION OF THE DRAWINGS

To describe the technical schemes in the embodiments of the present disclosure or in the prior art more clearly, the following briefly introduces the drawings required for describing the embodiments or the prior art.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

For the purpose of describing the technical solutions of the present disclosure, the following describes through specific embodiments.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "a," "an," and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the present disclosure, the terms "first", "second", and the like in the descriptions are only used for distinguishing, and cannot be understood as indicating or implying relative importance.

Figure 1:
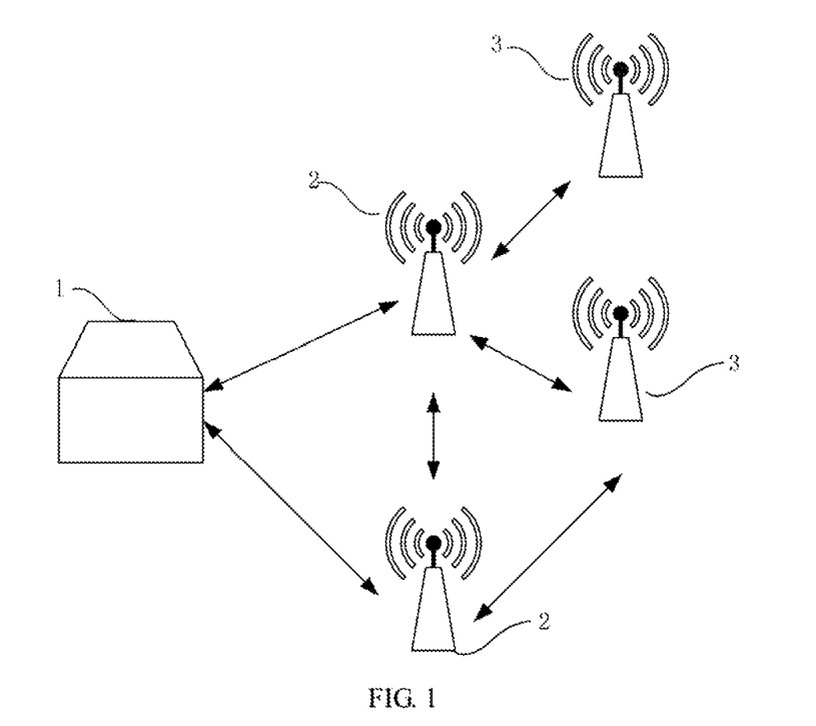
FIG. 1 is a schematic block diagram of an embodiment of a localization system according to the present disclosure.

FIG. 1 is a schematic block diagram of an embodiment of a localization system according to the present disclosure. As shown in FIG. 1, in the embodiments of the present disclosure, the technical solutions can be applied to a localization system including tags and anchors. Each localization tag can be a UWB (ultra wideband) localization device which can be installed on a robot or other mobile terminal. Each anchor is a base station in a preset range of the tag, which can be any device with a wireless transceiver function which includes but not limited to a NodeB, an evolved NodeB (eNodeB), an anchor in a fifth generation (5G) communication system, an anchor or network device in a future communication system, an access point in a WiFi system, a wireless relay node, a wireless backhaul node, or the like. The anchor can also be a wireless controller in a cloud radio access network (CRAN), or be a network device in a 5G network or a future evolved network. In addition, the anchor can also be a small station, a transmission node, or the like.

As shown in FIG. 1, a localization system is provided, which includes a localization tag 1, at least one first anchor 2, and at least one second anchor 3.

The second anchor 3 is located in a preset range of the first anchor 2. The first anchor 2 stores the nearby anchor list, which periodically obtains wireless data flurries transmitted by the second anchor 3. Each wireless data frame includes an anchor identifier of the second anchor 3. The first anchor 2 reads a signal strength of the wireless data frame, stores the anchor identifier, the signal strength, and a time of receiving the wireless data frame of the second anchor 3 in a nearby anchor list and periodically updates the nearby anchor list, so that the anchor corresponding to the anchor identifier of the second anchor in in the nearby anchor list can be a valid ranging anchor. At the same time, the first anchor 2 also periodically transmits a wireless data frame to the second anchor 3 within the preset range.

The localization tag 1 is stored with the ranging anchor list, which is switched from a sleep state to an awake state periodically, and generates a ranging frame to broadcast according to the ranging anchor list in the awake state. The ranging frame includes an anchor identifier bit. If there is the anchor identifier in the ranging anchor list, the anchor identifier bit in the generated ranging frame is the anchor identifier in the ranging anchor list; if the ranging anchor list is empty and the anchor identifier bit of the generated ranging frame is also empty, the first anchor 2 receives the ranging frame, and the first anchor 2 returns a response frame to the localization tag 1 when there is the anchor identifier of the first anchor in the ranging frame or the anchor identifier bit is empty, where the response frame includes the anchor identifier of the first anchor, a time of the first anchor receiving the ranging frame, a time of the first anchor transmitting the response frame, and a nearby anchor list. The localization tag 1 calculates a distance between the localization tag 1 and the first anchor 2 based on a broadcast time of the ranging frame, a reception time of the response frame, the time of the first anchor receiving the ranging frame, and the time of the first anchor transmitting the response frame. At the same time, the localization tag 1 updates the ranging anchor list according to the nearby anchor list, so that the anchor corresponding to the anchor identifier in the ranging anchor list can be a valid anchor. In such a manner, even if the localization tag 1 is in a movement state, the ranging anchor can be switched in time, so that the nearby first anchor 2 can return the response frame so as to perform ranging.

In an actual system, the amount of anchors and the localization tags may not be limited to the examples of this embodiment or other embodiments.

Figure 2:
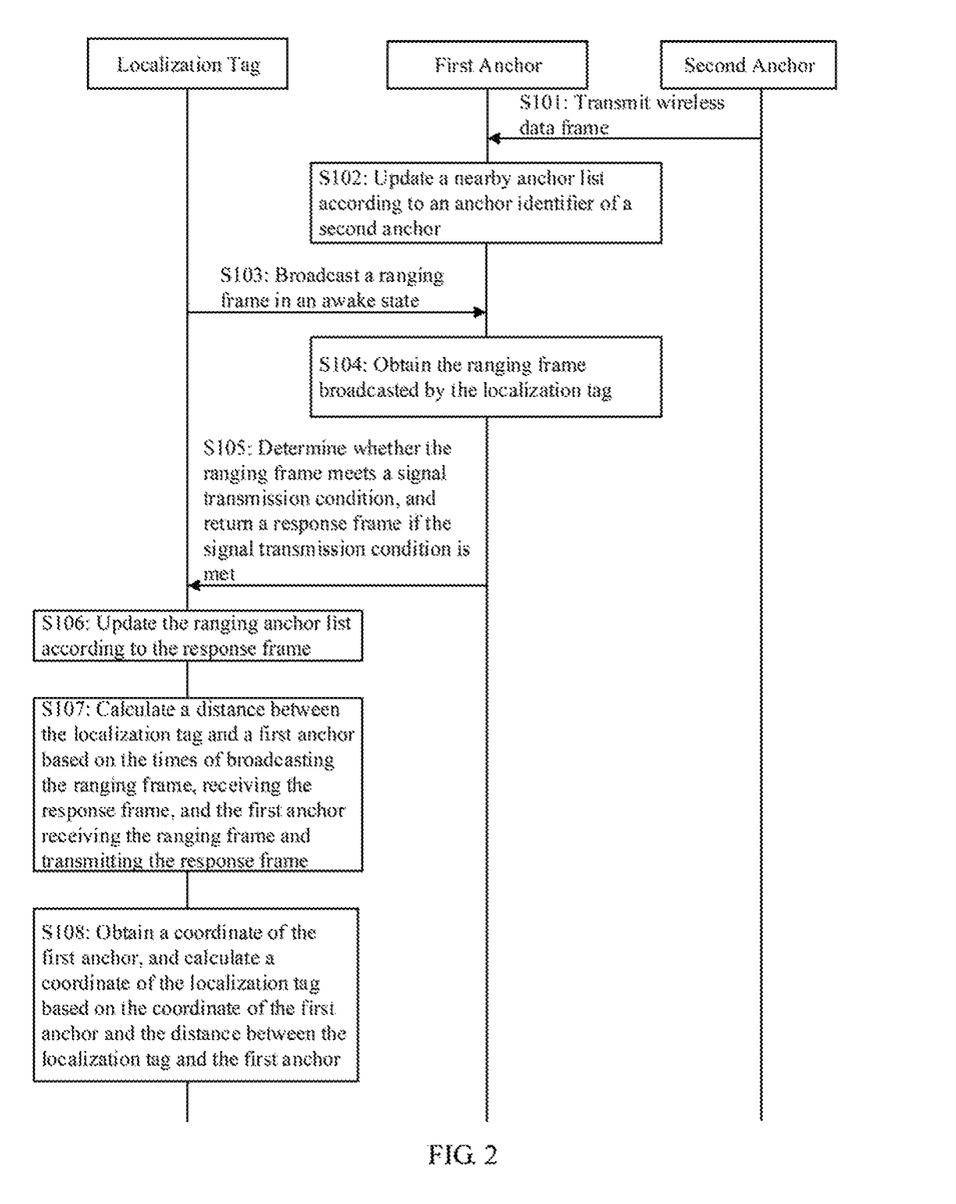
FIG. 2 is a flow chart of an embodiment of a localization method according to the present disclosure.

FIG. 2 is a flow chart of an embodiment of a localization method according to the present disclosure. In this embodiment, a localization method is provided. The method is a computer-implemented method executable for a processor, which may be implemented through and applied to the localization system as shown in FIG. 1 which includes a localization tag and a plurality of anchors. As shown in FIG. 2, the method includes the following steps.

S101: obtaining, through a first anchor, a wireless data frame transmitted by a second anchor within a preset range of the first anchor, where the wireless data frame includes an anchor identifier of the second anchor.

In which, the anchors of the localization system include a plurality of first anchors and a plurality of second anchors. Each of the anchors periodically transmits the wireless data frame to the surrounding anchors, where the anchors that receive the wireless data frame are defined as the first anchors, and the anchors that transmit the wireless data frames are defined as the second anchors.

S102: updating, through the first anchor, a nearby anchor list according to the anchor identifier of the second anchor, where the nearby anchor list is stored in the first anchor.

As an example rather than limitation, the first anchor reads the signal strength and reception time of the wireless data frame so as to update the nearby anchor list based on the signal strength and reception time. The fields of the nearby anchor list include the anchor identity of the second anchor, the signal strength of receiving the wireless data frame, and the time of receiving the wireless data frame. The first anchor updates the nearby anchor list according to the received wireless data frame. For example, a radio frequency chip on the first anchor reads the signal strength of the received radio data frame, and the first anchor records timestamp information of receiving the radio data frame; if there is no anchor identifier of the second anchor corresponding to the radio data frame in the nearby anchor list, a record is added to the nearby anchor list; if there is already the anchor identifier of the second anchor stored in the nearby anchor list, it only updates the corresponding signal strength of receiving the wireless data frame and the corresponding time of receiving the wireless data frame.

In one embodiment, the first anchor periodically clears the record that is not updated within a preset time in the nearby anchor list according to the time of receiving the wireless data frame. Because each anchor periodically transmits the wireless data frame to the surrounding anchors, it can be taken as that the second anchor is faulty if the first anchor does not receive the wireless data frame transmitted by the second anchor within a preset time, and the un-updated record of the wireless data frame is periodically cleared, so that the second anchor corresponding to the record in the nearby anchor list can be a valid anchor.

In one embodiment, the first anchor periodically sorts the records in the nearby anchor list according to the signal strength of receiving the wireless data frame, and clears the record with the signal strength smaller than a preset value.

S103: broadcasting, through the localization tag, a ranging frame in an awake state, where the localization tag stores a ranging anchor list, and the ranging frame is generated, according to the ranging anchor list.

In which, the localization tag is designed with low-power, and is switched from the sleep state to the awake state periodically to broadcast the ranging frame, thereby realizing a longer endurance. The localization tag is stored with the localization anchor list which includes an anchor identification field. If the ranging anchor list is not empty, all the anchor identifiers in the anchor identification field are read to generate the ranging frame; if the ranging anchor list is empty, the anchor identification bit of the generated ranging frame is empty. For example, the ranging frame includes a flag bit and an ID bits; if the ranging anchor list is empty, the flag bit is 0, and the ID bits is empty; if the ranging anchor list is not empty, the ID bits includes N anchor identifiers, and the flag bit is N, where the N anchor identifiers can be all the anchor identifiers in the ranging anchor list, or be a part of the anchor identifiers in the ranging anchor list.

S104: obtaining, through the first anchor, the ranging frame broadcasted by the localization tag.

In which, all the first anchors in the preset range of the localization tag can receive the ranging frame.

S105: determining, through the first anchor, whether the ranging frame meets a signal transmission condition, and returning, through the first anchor, a response frame to the localization tag if the signal transmission condition is met, where the response frame includes the anchor identifier of the first anchor, the time of the first anchor receiving the ranging frame, the time of the first anchor transmitting the response frame, and the nearby anchor list.

In which, when receiving the ranging frame and transmitting the response frame, the first anchor records timestamp information to add to the response frame.

As an example rather than limitation, if the ranging anchor list is not empty, the anchor identifier bit of the ranging frame received by the first anchor is not empty, and the anchor identifier of the first anchor is in the ranging frame, it determines that the signal transmission condition is met, and the first anchor returns the response frame according to a transmission time corresponding to the anchor identifier of the first anchor in the ranging frame. In one embodiment, each first anchor sequentially returns the response frame according to the order of the anchor identity of the first anchors in the ranging frame, so that the localization to sequentially receive the response frames and store them. For example, the response frames can be returned to the localization tag every 3 seconds according to the order of the anchor identity of the first anchor.

If the ranging anchor list is empty and the anchor identifier bit of the ranging frame received by the first anchor is empty, it determines that the signal transmission condition is met, and the first anchor returns the response frame according to the preset time. For example, each of the first anchors that has received the ranging frame randomly returns the response frame. Correspondingly, the time at which the localization tag receives the response frames is not fixed. If the localization tag receives a plurality of conflicting response frames, only one of the response frames is read, thereby ensuring that the localization tag can receive the data of at least one ranging anchor.

If the ranging anchor list is not empty, the anchor identifier bit of the ranging frame received by the first anchor is not empty, and there is no anchor identifier of the first anchor in the ranging frame, it determines that the signal transmission condition is not met, and the first anchor does not transmit the response frame to the localization tag.

It should be noted that, the first anchor can transmit the anchor identifiers of all the second anchors in the nearby anchor list to the localization tag, or can transmit the anchor identifiers of the second anchor that has the signal strength greater than the preset value in the nearby anchor list to the localization tag.

S106: updating, through the localization tag, the ranging anchor list according to the response frame.

As an example rather than limitation, the ranging anchor list includes an anchor identifier of the first anchor, an anchor weight of the first anchor, an anchor identifier of the second anchor, and an anchor weight of the second anchor. After receiving the response frame, the localization tag adds the information in the response frame to the ranging anchor list. The localization tag calculates the anchor weight of the first anchor based on the first anchor identifier in the response frame; calculates the anchor weight of the second anchor based on an occurrence amount of the anchor identifier of the second anchor in the nearby anchor list; and updates the ranging anchor list based on the anchor weight of the first anchor and the anchor weight of the second anchor.

In which, each anchor in the localization system is used as the first anchor to receive the wireless data frame transmitted by the surrounding second anchor, and simultaneously used as the second anchor transmit to the wireless data frame to the surrounding first anchor. The localization tag receives the nearby anchor list, counts the occurrence amount of the anchor identifier of the second anchor in the nearby anchor list, and updates the anchor weight corresponding to the second anchor identifier in the ranging anchor list according to the occurrence amount of the anchor identifier of the second anchor. For example, in a process of the localization tag receiving the response frame, the occurrence amount of the anchor identifier of the second anchor in all the nearby anchor lists is M, the anchor weight of the second anchor in the ranging anchor list is correspondingly increased with M. The localization tag updates the anchor weight according to the anchor identifier of the first anchor in the broadcasted ranging frame and the anchor identifier of the first anchor corresponding to the received response frame. For example, if there is the anchor identifier of a certain first anchor in the ranging frame broadcasted by the localization tag, and the anchor identifier of the first anchor is not in the response frame received within a preset time, the anchor weight corresponding to the first anchor is reduced by P, so that the first anchor corresponding to the record in the ranging anchor list in the localization tag is a valid anchor, and the valid anchor can return the response frame when the ranging frame is broadcasted so as to increase the accuracy of ranging.

In one embodiment, the localization tag can sort the ranging anchor list according to the anchor weight of the first anchor and the anchor weight of the second anchor, clear the record in the ranging anchor list that has the weight less than the preset value, or write the record in the ranging anchor list that has the weight greater than the preset value into the anchor identification bit of the ranging frame so as to broadcast.

In one embodiment, the localization tag can also clear the record that is not updated within the preset time in the ranging anchor list according to the time of each anchor returning the response frame.

S107: calculating, through the localization tag, a distance between the localization tag and the first anchor based on a time of broadcasting the ranging frame, a time of receiving the response frame, the time of the first anchor receiving the ranging frame, and the time of the first anchor transmitting the response frame.

In which, when broadcasting the ranging frame and receiving the response frame, the localization tag records the timestamp information. When calculating the distance, the localization tag reads the broadcast time of the ranging frame and the reception time of the response frame, and simultaneously reads the time of the first anchor receiving the ranging frame and the time of the first anchor transmitting the response frame that are transmitted by the first anchor, and then calculates the distance between the localization tag and the first anchor corresponding to each response frame according to the TOF (time-of-flight) ranging method. It should be noted that, the localization tag can also transmit the broadcast time of the ranging frame, the reception time of the response frame, the time of the first anchor receiving the ranging frame, and the time of the first anchor transmitting the response frame wirelessly or through a serial port, so as to perform the calculation of ranging on other terminal device.

S108: obtaining, through the localization tag, a coordinate of the first anchor, and calculating, through the localization tag, a coordinate of the localization tag based on the coordinate of the first anchor and the distance between the localization tag and the first anchor.

In which, the coordinate of the first anchor can be stored in the localization tag, and the localization tag reads the coordinate of the first anchor, and calculates the coordinate of the localization tag according to the distance between the localization tag and each first anchor by using a preset algorithm. For example, the coordinate of the localization tag can be calculated using a triangle centroid method or a least squares method.

In the localization method provided by the above-mentioned embodiment, the first anchor obtains the wireless data frame transmitted by the second anchor in the preset range, and updates the nearby anchor list according to the wireless data frame; the localization tag broadcasts the ranging frame in the awake state, and the first anchor returns the response frame according to the ranging frame; and the localization tag updates the ranging anchor list according to the response frame and calculates the distance between the localization tag and the first anchor. In such a manner, even if in movement, the localization tag can switch the anchor for ranging according to the updated ranging anchor list in time, thereby automatically ranging with the nearby anchors.

It should be understood that, the sequence of the serial number of the steps in the above-mentioned embodiments does not mean the execution order while the execution order of each process should be determined by its function and internal logic, which should not be taken as an limitation to the implementation process of the embodiments.

Figure 3:
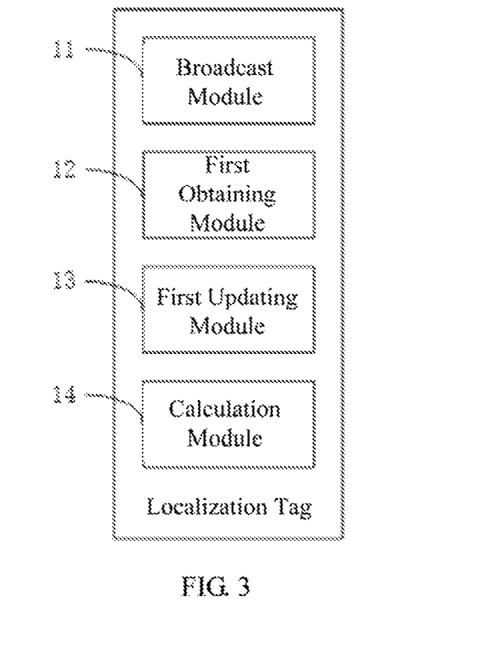
FIG. 3 is a schematic block diagram of an example of a localization tag in the method of FIG. 2 according to an embodiment of the present disclosure.

FIG. 3 is a schematic block diagram of an example of a localization tag in the method of FIG. 2 according to an embodiment of the present disclosure. Corresponding to the localization method of FIG. 2, a localization tag is provided. For convenience of description, only parts related to this embodiment are shown. As shown in FIG. 3, the localization tag includes:

a broadcast module 11 configured to broadcast a ranging frame in a awake state of the localization tag, where the localization tag stores a ranging anchor list, and the ranging frame is generated according to the ranging anchor list;

a first obtaining module 12 configured to obtain a response frame returned by the first anchor according to the ranging frame; where, the response frame includes an anchor identifier of the first anchor, a time of the first anchor receiving the ranging frame, a time of the first anchor transmitting the response frame, and a nearby anchor list; where, the nearby anchor list includes an anchor identifier of a second anchor within a preset range of the first anchor, and the nearby anchor list is updated by the first anchor according to a wireless data frame received from the second anchor;

a first updating module 13 configured to update the ranging anchor list according to the response frame; and a calculation module 14 is configured to calculate a distance between the localization tag and the first anchor based on a time of broadcasting the ranging frame, a time of receiving the response frame, the time of the first anchor receiving the ranging frame, and the time of the first anchor transmitting the response frame.

In one embodiment, the ranging anchor list includes an anchor identifier of the first anchor, an anchor weight of the first anchor, an anchor identifier of the second anchor, and an anchor weight of the second anchor.

The first updating module 13 is configured to calculate the anchor weight of the first anchor based on the first anchor identifier in the response frame: calculate the anchor weight of the second anchor based on an occurrence amount of the anchor identifier of the second anchor in the nearby anchor list; and update the ranging anchor list based on the anchor weight of the first anchor and the anchor weight of the second anchor.

In one embodiment, the calculation module 14 is further configured to: obtain a coordinate of the first anchor; and calculate a coordinate of the localization tag based on the coordinate of the first anchor and the distance between the localization tag and the first anchor.

In this embodiment, each of the above-mentioned modules/units is implemented in the form of software, which can be computer program(s) stored in a memory of the localization tag and executable on a processor of the localization tag. In other embodiments, each of the above-mentioned modules units may be implemented in the form of hardware (e.g., a circuit of the localization tag which is coupled to the processor of the localization tag) or a combination of hardware and software (e.g., a circuit with a single chip microcomputer).

Figure 4:
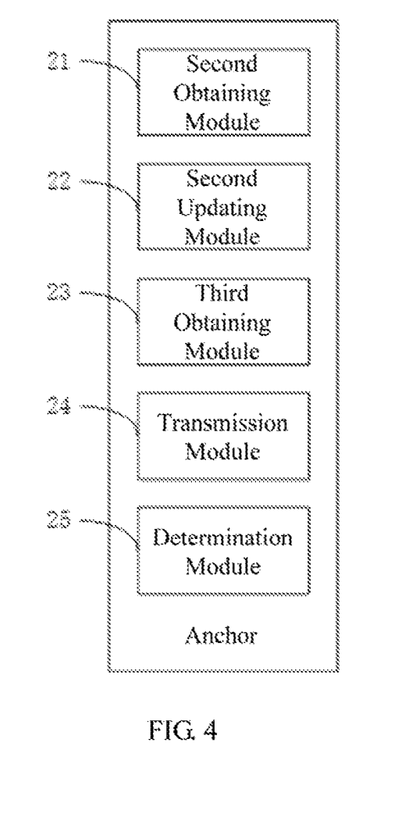
FIG. 4 is a schematic block diagram of an example of an anchor in the method of FIG. 2 according to an embodiment of the present disclosure.

FIG. 4 is a schematic block diagram of an example of an anchor in the method of FIG. 2 according to an embodiment of the present disclosure. An anchor is provided. For convenience of description, only parts related to this embodiment are shown. As shown in FIG. 4, the anchor includes:

a second obtaining module 21 configured to obtain a wireless data frame transmitted by a second anchor within a preset range of the first anchor, where the wireless data frame includes an anchor identifier of the second anchor;

a second updating module 22 configured to update a nearby anchor list according to the anchor identifier of the second anchor, where the nearby anchor list is stored in the first anchor;

a third obtaining module 23 configured to obtain a ranging frame broadcasted by a localization tag, where the localization tag stores a ranging anchor list, and the ranging frame is generated according to the ranging anchor list;

a transmission module 24 configured to transmit a response frame to the localization tag in response to the ranging frame meeting a signal transmission condition; where, the response frame includes an anchor identifier of the first anchor, a time of the first anchor receiving the ranging frame, a time of the first anchor transmitting the response frame, and the nearby anchor list; where, the localization tag is configured to update the ranging anchor list according to the response frame and calculate a distance between the localization tag and the first anchor based on a time of broadcasting the ranging frame, a time of receiving the response frame, a time of the first anchor receiving the ranging frame, and a time of the first anchor transmitting the response frame.

In one embodiment, the anchor further includes a determination module 25 configured to: determine the signal transmission condition as being met, in response to there being the anchor identifier of the first anchor in the ranging flume or the ranging anchor list being empty; and determine the signal transmission condition as not being met, in response to the ranging anchor list not being empty and there being no the anchor identifier of the first anchor in the ranging frame.

In one embodiment, the transmission module 24 is configured to: transmit the response frame according to a transmission time corresponding to the anchor identifier of the first anchor in the ranging frame, in response to there being the anchor identifier of the first anchor in the ranging frame; and transmit the response frame within a preset time, in response to the ranging anchor list being empty.

In one embodiment, the second updating module 22 is configured to: read a signal strength and a reception time of the wireless data frame; and update the nearby anchor list based on the signal strength and the reception time.

In this embodiment, each of the above-mentioned modules/units is implemented in the form of software, which can be computer program(s) stored in a memory of the anchor and executable on a processor of the anchor. In other embodiments, each of the above-mentioned modules/units may be implemented in the form of hardware (e.g., a circuit of the anchor which is coupled to the processor of the anchor) or a combination of hardware and software (e.g., a circuit with a single chip microcomputer).

It should be noted that, since the information interaction, the execution process, and the like between the above-mentioned apparatus/units are based on the same concept with the above-mentioned method embodiment, for the details of the specific functions and the technical effects thereof can refer to the method embodiment, which are not described herein.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

Figure 5:
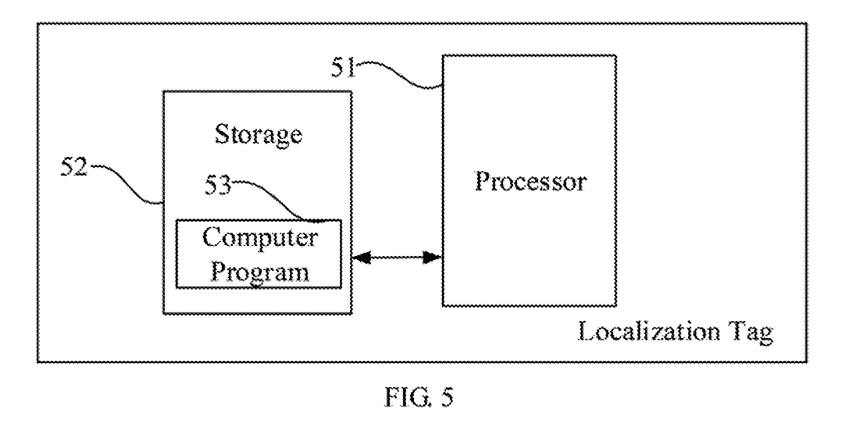
FIG. 5 is a schematic block diagram of the structure of an embodiment of a localization tag according to the present disclosure.

FIG. 5 is a schematic block diagram of the structure of an embodiment of a localization tag according to the present disclosure. As shown in FIG. 5, a localization tag for the localization system of the above-mentioned embodiment of FIG. 1 is provided, which includes: at least one processor 51 (only one is shown in FIG. 5), a storage 52, and a computer program 53 stored in the storage 52 and executable on the at least one processor 51. When executing (instructions in) the computer program 53, the processor 51 implements the steps in each of the above-mentioned embodiments that are executed by the localization tag.

The processor 51 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 52 may be an internal storage unit of the localization tag, for example, a bard disk or a memory of the localization tag. The storage 52 may also be an external storage device of the localization tag, for example, a plug-in hard disk, a smart media card (SMC), a secure digital (SD) card, flash card, and the like, which is equipped on the localization tag. Furthermore, the storage 52 may further include both an internal storage unit and an external storage device, of the localization tag. The storage 52 is configured to store the computer program 53 and other programs and data required by the localization tag. The storage 52 may also be used to temporarily store data that has been or will be output.

It can be noted that, the above-mentioned FIG. 5 does not constitute a limitation on the structure of the localization tag, and may include more or fewer components than those shown in the figure, or a combination of some components or different components.

Figure 6:
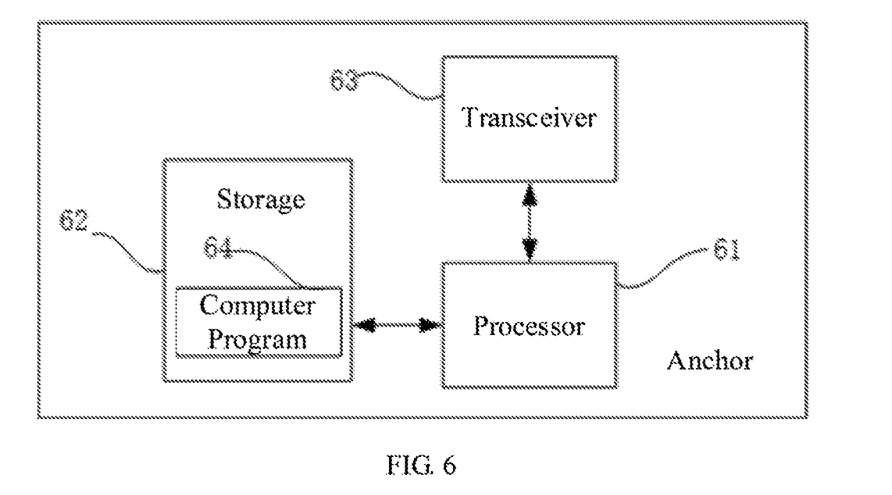
FIG. 6 is a schematic block diagram of the structure of an embodiment of an anchor according to the present disclosure.

FIG. 6 is a schematic block diagram of the structure of an embodiment of an anchor according to the present disclosure. As shown in FIG. 6, an anchor for the localization system of the above-mentioned embodiment of FIG. 1 is provided, which includes: a processor 61, a storage 62, a transceiver 63, and a computer program 64 stored in the storage 62 and executable on the at least one processor 61. When executing (instructions in) the computer program 63, the processor 61 implements the steps in each of the above-mentioned embodiments that are executed by the anchor.

The processor 61 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 62 may be an internal storage unit of the anchor, for example, a hard disk or a memory of the anchor. The storage 62 may also be an external storage device of the anchor, for example, a plug-in hard disk, a smart media card (SMC), a secure digital (SD) card, flash card, and the like, which is equipped on the anchor. Furthermore, the storage 62 may further include both an internal storage unit and an external storage device, of the anchor. The storage 62 is configured to store the computer program 64 and other programs and data required by the anchor. The storage 62 may also be used to temporarily store data that has been or will be output.

The transceiver 63 can include a wireless communication module and a wired communication module, where the wireless communication module is mainly for wireless communication with the localization tag and the anchor, and the wired communication/module is mainly for wired communication with the network devices. The transceiver 63 can include an antenna which may have only one array element or may be an antenna array including a plurality of array elements. The transceiver 63 can receive electromagnetic wave signals through the antenna, perform frequency modulation and filtering on the electromagnetic wave signals, and transmit the processed signals to the processor 61. The transceiver 63 can also receive the signals to be transmitted from the processor 61, perform frequency modulation and amplification on the signals, and convert the signals into electromagnetic wave through the antenna to radiate.

It can be noted that, the above-mentioned FIG. 6 does not constitute a limitation on the structure of the anchor, and may include more or fewer components than those shown in the figure, or a combination of some components or different components.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device)/terminal device and method may be implemented in other manners. For example, the above-mentioned apparatus/terminal device embodiment is merely exemplary. For example, the division of modules or units is merely a logical functional division, an other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented localization method for a localization tag, comprising executing on a processor steps of:

broadcasting a ranging frame in a awake state of the localization tag, wherein the localization tag stores a ranging anchor list, and the ranging frame is generated according to the ranging anchor list, and wherein the ranging frame comprises an anchor identifier bit, a part of anchor identifiers or all of the anchor identifiers in an anchor identification field of the ranging anchor list are read to generate the ranging frame in response to the ranging anchor list not being empty, and the anchor identification bit of the ranging frame is empty in response to the ranging anchor list being empty;

obtaining a response frame returned by a first anchor according to the ranging frame; wherein, the response frame comprises an anchor identifier of the first anchor, a time of the first anchor receiving the ranging frame, a time of the first anchor transmitting the response frame, and a nearby anchor list; wherein, the nearby anchor list comprises an anchor identifier of a second anchor within a preset range of the first anchor, and the nearby anchor list is updated by the first anchor according to a wireless data frame received from the second anchor;

updating the ranging anchor list according to the response frame; and calculating a distance between the localization tag and the first anchor based on a time of broadcasting the ranging frame, a time of receiving the response frame, the time of the first anchor receiving the ranging frame, and the time of the first anchor transmitting the response frame.

2. The method of claim 1, wherein the ranging anchor list comprises an anchor identifier of the first anchor, an anchor weight of the first anchor, an anchor identifier of the second anchor, and an anchor weight of the second anchor, and the step of updating the ranging anchor list according to the response frame comprises:

calculating the anchor weight of the first anchor based on the anchor identifier of the first anchor in the response frame, wherein the anchor weight of the first anchor is reduced by P, in response to the anchor identifier of the first anchor not being received within a preset time;

calculating the anchor weight of the second anchor based on an occurrence amount of the anchor identifier of the second anchor in the nearby anchor list, wherein, the anchor weight of the second anchor in the ranging anchor list is increased with the occurrence amount of the anchor identifier of the second anchor; and updating the ranging anchor list based on the anchor weight of the first anchor and the anchor weight of the second anchor.

3. The method of claim 2, wherein the step of updating the ranging anchor list based on the anchor weight of the first anchor and the anchor weight of the second anchor comprises:

sorting the ranging anchor list according to the anchor weight of the first anchor and the anchor weight of the second anchor, and clearing a record in the ranging anchor list that has the anchor weight less than a preset value.

4. The method of claim 1, wherein the step of calculating the distance between the localization tag and the first anchor based on the time of broadcasting the ranging frame, the time of receiving the response frame, the time of the first anchor receiving the ranging frame, and the time of the first anchor transmitting the response frame comprises;
   obtaining a coordinate of the first anchor; and
   calculating a coordinate of the localization tag based on the coordinate of the first anchor and the distance between the localization tag and the first anchor.

5. The method of claim 1, wherein the step of updating the ranging anchor list according to the response frame comprises:
   clearing a record that is not updated within a preset time the ranging anchor list, according to time of each anchor transmitting the response frame.

6. A computer-implemented localization method for a first anchor, comprising executing on a processor steps of:
   obtaining a wireless data frame transmitted by a second anchor within a preset range of the first anchor, wherein the wireless data frame comprises an anchor identifier of the second anchor;
   updating a nearby anchor list according to the anchor identifier of the second anchor, wherein the nearby anchor list is stored in the first anchor;
   obtaining a ranging frame broadcasted by a localization tag, wherein the localization tag stores a ranging anchor list, and the ranging frame is generated according to the ranging anchor list;
   determining whether there is anchor identifier of the first anchor in the ranging frame or the ranging anchor list is empty according to the ranging frame;
   determining a signal transmission condition as being met, in response to there being the anchor identifier of the first anchor in the ranging frame or the ranging anchor list being empty, and transmitting a response frame to the localization tag; wherein, the response frame comprises the anchor identifier of the first anchor, a time of the first anchor receiving the ranging frame, a time of the first anchor transmitting the response frame, an the nearby anchor list; wherein, the localization tag is configured to update the ranging anchor list according to the response frame and calculate a distance between the localization tag and the first anchor, based on a time of broadcasting the ranging frame, a time of receiving the response frame, a time of the first anchor receiving the ranging frame, and a time of the first anchor transmitting the response frame; and
   determining the signal transmission condition as not being met, in response to the ranging anchor list not being empty and there being no the anchor identifier of the first anchor in the ranging frame.

7. The method of claim 6, wherein each first anchor sequentially returns the response frame according to an order of the anchor identifier of the first anchors in the ranging frame.

8. The method of claim 6, wherein the step of transmitting the response frame to the localization tag in response to the ranging frame meeting the signal transmission condition comprises:
   transmitting the response frame according to a transmission time corresponding to the anchor identifier of the first anchor in the ranging frame, in response to there being the anchor identifier of the first anchor in the ranging frame; and
   transmitting the response frame within a preset time, in response to the ranging anchor list being empty.

9. The method of claim 8, wherein the step of updating the nearby anchor list according to the anchor identifier of the second anchor comprises:

reading a signal strength and a reception time of the wireless data frame; and
   updating the nearby anchor list based on the signal strength and the reception time.

10. The method of claim 6, wherein the step of updating the nearby anchor list according to the anchor identifier of the second anchor comprises:
   periodically clearing a record that is not updated within a preset time in the nearby anchor list, according to time of receiving the wireless data frame.

11. The method of claim 6, wherein the step of updating the nearby anchor list according to the anchor identifier of the second anchor comprises:
   periodically sorting records in the nearby anchor list according to signal strength of receiving the wireless data frame, and clearing a record with the signal strength smaller than a preset value.

12. A localization system comprising:
   a localization tag; and
   a plurality of anchors, wherein the plurality of anchors comprises a plurality of first anchors for receiving a wireless data frame transmitted by the surrounding second anchor and a plurality of second anchors for transmitting the wireless data frame to the surrounding first anchor; wherein:
   the first anchor obtains a wireless data frame transmitted by the second anchor within a preset range of the first anchor, wherein the wireless data frame comprises an anchor identifier of the second anchor; the first anchor updates a nearby anchor list according to the anchor identifier of the second anchor, wherein the nearby anchor list is stored in the first anchor;
   the localization tag broadcasts a ranging frame in an awake state, wherein the localization tag stores a ranging anchor list, and the ranging frame is generated according to the ranging anchor list; the first anchor obtains the ranging frame broadcasted by the localization tag;
   the first anchor determines whether the ranging frame meets a signal transmission condition, and returns a response frame to the localization tag in response to the signal transmission condition being met, wherein the response frame comprises the anchor identifier of the first anchor, the time of the first anchor receiving the ranging frame, the time of the first anchor transmitting the response frame, and the nearby anchor list; and
   the localization tag updates the ranging anchor list according to the response frame; the localization tag calculates a distance between the localization tag and the first anchor based on a time of broadcasting the ranging frame, a time of receiving the response frame, the time of the first anchor receiving the ranging frame, and the time of the first anchor transmitting the response frame; the localization tag obtains a coordinate of the first anchor, and calculating, through the localization tag, a coordinate of the localization tag based on the coordinate of the first anchor and the distance between the localization tag and the first anchor.

13. The system of claim 12, wherein each of the anchors is simultaneously used as the first anchor and the second anchor.

14. The system of claim 12, wherein the ranging anchor list comprises an anchor identifier of the first anchor, an anchor weight of the first anchor, an anchor identifier of the second anchor, and an anchor weight of the second anchor; and wherein the first anchor calculates the anchor weight of the first anchor based on the anchor identifier of the first anchor in the response frame, calculates the anchor weight of the second anchor based on an occurrence amount of the anchor identifier of the second anchor in the nearby anchor list; and updates the ranging anchor list based on the anchor weight of the first anchor and the anchor weight of the second anchor.

15. The system of claim 12, wherein the first anchor obtains a coordinate of the first anchor; and calculates a coordinate of the localization tag based on the coordinate of the first anchor and the distance between the localization tag and the first anchor.

16. The system of claim 12, wherein the localization tag determines the signal transmission condition as being met, in response to there being the anchor identifier of the first anchor in the ranging frame or the ranging anchor list being empty; and determines the signal transmission condition as not being met, in response to the ranging anchor list not being empty and there being no the anchor identifier of the first anchor in the ranging frame.

17. The system of claim 16, wherein the localization tag transmits the response frame according to a transmission time corresponding to the anchor identifier of the first anchor in the ranging frame, in response to there being the anchor identifier of the first anchor in the ranging frame; and transmits the response frame within a preset time, in response to the ranging anchor first being empty.

18. The system of claim 17, wherein the localization tag reads a signal strength and a reception time of the wireless data frame; and updates the nearby anchor list based on the signal strength and the reception time.

19. The system of claim 12, wherein the ranging frame comprises an anchor identifier bit, a part of anchor identifiers or all of the anchor identifiers in an anchor identification field of the ranging anchor list are read to generate the ranging frame in response to the ranging anchor list not being empty, and the anchor identification bit of the ranging frame is empty in response to the ranging anchor list being empty.

20. The system of claim 19, wherein the ranging frame comprises a flag bit and an ID bits;
    in response to the ranging anchor list being empty, the flab bit is 0, and the ID bits is empty; and
    in response to the ranging anchor list not being empty, the ID bits comprises N anchor identifiers, and the bit is N, wherein the N anchor identifiers are all the anchor identifiers in the ranging anchor list, or a part of the anchor identifiers in the ranging anchor list.

\* \* \* \* \*